United States Patent
Abhari et al.

(10) Patent No.: US 11,001,774 B2
(45) Date of Patent: *May 11, 2021

(54) BIORENEWABLE KEROSENE, JET FUEL, JET FUEL BLENDSTOCK, AND METHOD OF MANUFACTURING

(71) Applicant: REG SYNTHETIC FUELS, LLC, Ames, IA (US)

(72) Inventors: Ramin Abhari, Bixby, OK (US); David A. Slade, Ames, IA (US); H. Lynn Tomlinson, Tulsa, OK (US); Erik Ashby, S. San Francisco, CA (US); Nate Green, Ames, IA (US); Caroline Golden, Baton Rouge, LA (US)

(73) Assignee: REG SYNTHETIC FUELS, LLC, Ames, IA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/284,827

(22) Filed: Feb. 25, 2019

(65) Prior Publication Data

US 2019/0276758 A1    Sep. 12, 2019

Related U.S. Application Data

(63) Continuation of application No. 15/592,080, filed on May 10, 2017, now Pat. No. 10,246,658.

(60) Provisional application No. 62/334,968, filed on May 11, 2016.

(51) Int. Cl.
| | | |
|---|---|---|
| *C10G 3/00* | (2006.01) | |
| *C10L 1/04* | (2006.01) | |
| *C10L 1/08* | (2006.01) | |
| *C10L 5/36* | (2006.01) | |
| *C10L 11/04* | (2006.01) | |

(52) U.S. Cl.
CPC ............... *C10L 1/08* (2013.01); *C10G 3/50* (2013.01); *C10G 3/54* (2013.01); *C10L 1/04* (2013.01); *C10L 5/361* (2013.01); *C10L 5/365* (2013.01); *C10L 11/04* (2013.01); *C10G 2300/1011* (2013.01); *C10G 2300/1014* (2013.01); *C10G 2300/304* (2013.01); *C10G 2400/04* (2013.01); *C10G 2400/08* (2013.01); *C10L 2200/0469* (2013.01); *C10L 2230/06* (2013.01); *C10L 2270/026* (2013.01); *C10L 2270/04* (2013.01); *Y02E 50/10* (2013.01); *Y02P 30/20* (2015.11); *Y02T 50/678* (2013.01)

(58) Field of Classification Search
None
See application file for complete search history.

(56) References Cited

U.S. PATENT DOCUMENTS

| | | |
|---|---|---|
| 3,723,292 A | 3/1973 | Glessner et al. |
| 3,985,638 A | 10/1976 | Kirk, Jr. |
| 4,049,686 A | 9/1977 | Ringers et al. |
| 4,698,185 A | 10/1987 | Dijkstra et al. |
| 4,734,226 A | 3/1988 | Parker et al. |
| 5,049,333 A | 9/1991 | Wolfe et al. |
| 5,239,096 A | 8/1993 | Rohdenburg et al. |
| 5,762,656 A | 6/1998 | Burke et al. |
| 8,026,401 B2 | 9/2011 | Abhari et al. |
| 8,231,804 B2 | 7/2012 | Abhari |
| 8,394,900 B2 | 3/2013 | Abhari |
| 8,575,409 B2 | 11/2013 | Havlik et al. |
| 8,581,013 B2 | 11/2013 | Abhari et al. |
| 8,642,517 B2 | 2/2014 | Matsui et al. |
| 8,821,842 B2 | 9/2014 | Lange et al. |
| 8,969,259 B2 | 3/2015 | Abhari et al. |
| 9,133,080 B2 | 9/2015 | Abhari et al. |
| 9,187,385 B1 | 11/2015 | Parrott |
| 9,206,372 B2 | 12/2015 | Wang et al. |
| 9,279,091 B2 | 3/2016 | Stinson et al. |
| 9,725,540 B2 | 8/2017 | Uekusa et al. |
| 9,963,401 B2 | 5/2018 | Abhari et al. |
| 2004/0167355 A1 | 8/2004 | Abazajian |
| 2007/0260102 A1 | 11/2007 | Duarte Santiago et al. |
| 2008/0193404 A1 | 8/2008 | Lange et al. |
| 2010/0043278 A1* | 2/2010 | Brevoord ............. B01J 35/10 44/308 |
| 2010/0145114 A1 | 6/2010 | Abhari et al. |
| 2010/0323937 A1 | 12/2010 | Wu et al. |
| 2011/0300594 A1 | 12/2011 | Ritter et al. |
| 2013/0131408 A1 | 5/2013 | Abhari et al. |

(Continued)

FOREIGN PATENT DOCUMENTS

| | | |
|---|---|---|
| CA | 1083558 A | 8/1980 |
| EP | 2 415 738 A1 | 2/2012 |
| SG | 2013051370 A | 12/2014 |

OTHER PUBLICATIONS

International Search Report and Written Opinion for International Application No. PCT/US2017/032009, dated Aug. 7, 2017 (9 pages).

(Continued)

*Primary Examiner* — Philip Y Louie
(74) *Attorney, Agent, or Firm* — Foley & Lardner LLP

(57) ABSTRACT

The present technology provides compositions that include at least about 98 weight percent ("wt %") n-paraffins which, among other surprising features, may be suitable for use as a diesel fuel, an aviation fuel, a jet fuel blendstock, a blendstock to reduce the cloud point of a diesel fuel, a fuel for portable heaters, and/or as a charcoal lighter fluid. The composition includes at least about 98 wt % $C_7$-$C_{12}$ n-paraffins, where at least about 10 wt % of composition includes n-decane, at least about 20 wt % of the composition includes n-dodecane, and at least about 75 wt % of the composition includes even carbon number paraffins. The composition also includes less about 0.1 wt % oxygenates and less than about 0.1 wt % aromatics. The composition may be produced by a process that includes hydrotreating a biorenewable feedstock comprising at least one of palm kernel oil, coconut oil, babassu oil, microbial oil, or algal oil.

35 Claims, No Drawings

(56) References Cited

U.S. PATENT DOCUMENTS

| | | | |
|---|---|---|---|
| 2013/0217606 | A1 | 8/2013 | Wang et al. |
| 2013/0225883 | A1 | 8/2013 | Mattingly et al. |
| 2013/0317265 | A1 | 11/2013 | Small et al. |
| 2014/0081057 | A1 | 3/2014 | Abhari et al. |
| 2014/0081065 | A1 | 3/2014 | Sengupta et al. |
| 2014/0213834 | A1 | 7/2014 | Patil et al. |
| 2014/0303057 | A1 | 10/2014 | Abhari et al. |
| 2014/0378720 | A1 | 12/2014 | Wu et al. |
| 2015/0005551 | A1 | 1/2015 | Havlik et al. |
| 2015/0133355 | A1 | 5/2015 | Abhari et al. |
| 2016/0009610 | A1 | 1/2016 | Hargis et al. |
| 2016/0046541 | A1 | 2/2016 | Kelkar et al. |
| 2016/0068453 | A1* | 3/2016 | Fichtl ................... C07C 9/15 585/323 |
| 2016/0264491 | A1 | 9/2016 | Abhari et al. |
| 2017/0137721 | A1 | 5/2017 | Ho et al. |
| 2017/0137733 | A1 | 5/2017 | Ho et al. |

OTHER PUBLICATIONS

Non-Final Office Action in U.S. Appl. No. 15/592,080 dated Jun. 19, 2018 (9 pages).
Notice of Allowance in U.S. Appl. No. 15/592,080 dated Nov. 16, 2018 (11 pages).

\* cited by examiner

BIORENEWABLE KEROSENE, JET FUEL, JET FUEL BLENDSTOCK, AND METHOD OF MANUFACTURING

CROSS-REFERENCE TO RELATED APPLICATIONS

This application is a continuation of U.S. application Ser. No. 15/592,080, filed on May 10, 2017, which claims the benefit of priority to U.S. Provisional Application No. 62/334,968, filed on May 11, 2016, the entireties of each of which are hereby incorporated by reference for any and all purposes.

FIELD

The present technology relates generally to compositions suitable as a diesel fuel, a diesel fuel additive, a diesel fuel blendstock, a turbine fuel, a turbine fuel additive, a turbine fuel blendstock, an aviation fuel, an aviation fuel additive, an aviation fuel blendstock, a fuel for portable heaters, a fuel for portable generators, and/or as a charcoal lighter fluid. More particularly, and not by way of limitation, the present technology provides such compositions from one or more biorenewable feedstocks.

BACKGROUND

Biomass is a renewable alternative to fossil raw materials in the production of fuels and chemicals. The increase of renewable products and biofuels production is part of the government's strategy of sustainability, improving energy security and reducing greenhouse gas emissions.

SUMMARY

In an aspect, a composition is provided that includes at least about 98 wt % $C_7$-$C_{12}$ n-paraffins, wherein at least about 10 wt % of composition includes n-decane, at least about 20 wt % of the composition includes n-dodecane, and at least about 75 wt % of the composition includes even carbon number paraffins. The composition includes less than about 0.1 wt % oxygenates and less than about 0.1 wt % aromatics. The composition of any embodiment herein may be produced by a process that includes hydrotreating a biorenewable feedstock, where the biorenewable feedstock includes at least one of palm kernel oil, coconut oil, babassu oil, microbial oil, or algal oil. The composition of any embodiment herein may be suitable as a diesel fuel, diesel fuel additive, a diesel fuel blendstock, a turbine fuel, a turbine fuel additive, a turbine fuel blendstock, an aviation fuel, an aviation fuel additive, an aviation fuel blendstock, a fuel for portable heaters, a fuel for portable generators, and/or as a charcoal lighter fluid.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "aromatics" as used herein is synonymous with "aromates" and means both cyclic aromatic hydrocarbons that do not contain heteroatoms as well as heterocyclic aromatic compounds. The term includes monocyclic, bicyclic and polycyclic ring systems. The term also includes aromatic species with alkyl groups and cycloalkyl groups. Thus, aromatics include, but are not limited to, benzene, azulene, heptalene, phenylbenzene, indacene, fluorene, phenanthrene, triphenylene, pyrene, naphthacene, chrysene, anthracene, indene, indane, pentalene, and naphthalene, as well as alkyl and cycloalkyl substituted variants of these compounds. In some embodiments, aromatic species contains 6-14 carbons, and in others from 6 to 12 or even 6-10 carbon atoms in the ring portions of the groups. The phrase includes groups containing fused rings, such as fused aromatic-aliphatic ring systems (e.g., indane, tetrahydronaphthene, and the like).

"Oxygenates" as used herein means carbon-containing compounds containing at least one covalent bond to oxygen. Examples of functional groups encompassed by the term include, but are not limited to, carboxylic acids, carboxylates, acid anhydrides, aldehydes, esters, ethers, ketones, and alcohols, as well as heteroatom esters and anhydrides such as phosphate esters and phosphate anhydrides. Oxygenates may also be oxygen containing variants of aromatics, cycloparaffins, and paraffins as described herein.

The term "paraffins" as used herein means non-cyclic, branched or unbranched alkanes. An unbranched paraffin is an n-paraffin; a branched paraffin is an iso-paraffin. "Cycloparaffins" are cyclic, branched or unbranched alkanes.

The term "paraffinic" as used herein means both paraffins and cycloparaffins as defined above as well as predominantly hydrocarbon chains possessing regions that are alkane, either branched or unbranched, with mono- or di-unsaturation (i.e. one or two double bonds).

Hydroprocessing as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e. do not require catalyst) to catalytic. In the case of describing the main function of a particular hydroprocessing unit, for example an HDO reaction system, it is understood that the HDO reaction is merely one of the predominant reactions that are taking place and that other reactions may also take place.

Decarboxylation (DCO) is understood to mean hydroprocessing of an organic molecule such that a carboxyl group is removed from the organic molecule to produce $CO_2$, as well as decarbonylation which results in the formation of CO.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g. linoleic acid) may undergo partial hydrogenation to provide a hydroprocessed product wherein the polyunsaturated fatty acids are converted to mono-unsaturated fatty acids (e.g. oleic acid) without increasing the percentage of undesired saturated fatty acids (e.g. stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

"Aviation fuel" as used herein includes both jet fuel and aviation gasoline. Jet fuel also goes by the term aviation turbine fuel.

"Turbine fuel" as used herein includes, but is not limited to, a fuel combusted with compressed air to drive an electric generator, or to power ships and tanks. Turbine fuels are typically diesel or kerosene boiling range fuels.

It will be understood that if a composition is stated to include "$C_x$-$C_y$ hydrocarbons," such as $C_7$-$C_{12}$ n-paraffins, this means the composition includes one or more paraffins with a carbon number falling in the range from x to y.

The production of synthetic paraffinic kerosene (SPK) from biorenewable feedstocks for use as jet fuel currently involves hydrodeoxygenation (HDO) of lipids to n-paraffins followed by hydrocracking and/or hydroisomerization (HI) of the n-paraffins to iso-paraffins. These products are isoparaffinic compositions with ratio of isoparaffin-to-normal paraffin (iso/normal ratio) greater than 2, preferably greater than 4. This is because high concentrations of n-paraffins in a composition (e.g., iso/normal <2) has long been considered detrimental to low temperature performance of the fuel—such as the cloud point—and thus regarded as essentially unsuitable as a drop-in fuel (i.e., not requiring dilution with conventional fuels). Such compositions with high concentrations of n-paraffins are being regarded as especially unsuitable drop-in aviation fuels (e.g., such as a jet fuel per ASTM D1655 and/or ASTM D7566), winter diesels (e.g., per EN 590), artic diesels (e.g., per EN 590), etc. The HI reaction deemed necessary to provide appropriate cloud points typically occurs over a noble metal/zeolite (or amorphous silica-containing support) catalyst system. In addition to being costly, this type of catalyst typically requires removal of HDO reaction byproducts such as hydrogen sulfide, water, and ammonia in order to assure longer lifetimes for such HI catalysts. As such, this additional reaction step has significant impact on bio-SPK capital and operating costs. Furthermore, the temperatures (typically greater than 650° F.) and catalyst used for HI reactions may result in formation of aromatic byproducts. Aromatic compounds are also present in petroleum-based kerosene. Aromatic compounds are believed to polymerize into polyaromatic hydrocarbons (PAH) under certain combustion conditions. PAHs include several known and suspected carcinogens. When used as a portable fuel, such as a charcoal lighter fluid and particularly "pre-soak" lighter fluids that are imbedded in the charcoal as supplied by "self-lighting" charcoal products, the PAHs present a health concern as they may be inhaled or, for example, end up in food being heated and/or cooked via use of such charcoal.

The present technology provides compositions that include at least about 98 weight percent ("wt %") n-paraffins which, among other surprising features, may be suitable for use as a diesel fuel, an aviation fuel, a jet fuel blendstock, a blendstock to reduce the cloud point of a diesel fuel, a fuel for portable heaters, a fuel for portable generators, and/or as a charcoal lighter fluid. Such a composition may be generated from the HDO of lipids such as palm kernel oil, coconut oil, babassu oil, microbial oil (e.g., fatty acids of microbial origin), and algal oil, and may be produced without HI. The present technology also provides methods for generating the compositions of the present technology from biorenewable feedstocks, as well as useful co-products from such methods. Further, and without being bound to any theory, it is believed that the melt point of such compositions is lower than the melt point of its individual components. In any embodiment herein, the composition may include proportions of each individual component such that the melting point is at least substantially close to the eutectic melting point for such a mixture. By "substantially close" it is intended the composition has a melting point that is no more than 10% different than the eutectic melting point, preferably no more than 5% different, even more preferably no more than 2% different, much more preferably no more than 1% different. Furthermore, it may be that the composition includes proportions of each component such that the melting point is the eutectic melting point for such a mixture.

Thus, in an aspect, a composition is provided that includes at least about 98 wt % $C_7$-$C_{12}$ n-paraffins, where at least about 10 wt % of the composition includes n-decane, at least about 20 wt % of the composition includes n-dodecane, and at least about 75 wt % of composition includes even carbon number paraffins. The composition includes less than about 0.1 wt % oxygenates and less than about 0.1 wt % aromatics.

The composition may include $C_7$-$C_{12}$ n-paraffins in an amount of at least about 98 wt %, at least about 98.2 wt %, at least about 98.4 wt %, at least about 98.6 wt %, at least about 98.8 wt %, at least about 99 wt %, at least about 99.2 wt %, at least about 99.4 wt %, at least about 99.5 wt %, at least about 99.6 wt %, at least about 99.7 wt %, at least about 99.8 wt %, at least about 99.9 wt %, at least about 99.99 wt %, about 100 wt %, or any range including and in-between any two of these values.

The composition includes at least about 10 wt % n-decane. The composition may include n-decane in an amount up to about 40 wt %. Thus, the composition may include n-decane in an amount of about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, or any range including and in-between any two of these values.

The composition includes at least about 20 wt % n-dodecane. The composition may include n-dodecane in an amount up to about 80 wt %. Thus, the composition may include n-dodecane in an amount of about 20 wt %, about 22 wt %, about 24 wt %, about 26 wt %, about 28 wt %, about 30 wt %, about 32 wt %, about 34 wt %, about 36 wt %, about 38 wt %, about 40 wt %, about 42 wt %, about 44 wt %, about 46 wt %, about 48 wt %, about 50 wt %, about 52 wt %, about 54 wt %, about 56 wt %, about 58 wt %, about 60 wt %, about 62 wt %, about 64 wt %, about 66 wt %, about 68 wt %, about 70 wt %, about 72 wt %, about 74 wt %, about 76 wt %, about 78 wt %, about 80 wt %, or any range including and in-between any two of these values.

In any embodiment herein, the composition may include at least about 20 wt % of n-octane. The composition may include n-octane in an amount up to about 30 wt %. Thus, the composition may include n-octane in an amount of about 20 wt %, about 21 wt %, about 22 wt %, about 23 wt %, about 24 wt %, about 25 wt %, about 26 wt %, about 27 wt %, about 28 wt %, about 29 wt %, about 30 wt %, or any range including and in-between any two of these values.

While the composition has less than about 0.1 wt % oxygenates, the composition may have oxygenates in the amount of about 0.09 wt %, about 0.08 wt %, about 0.07 wt %, about 0.05 wt %, about 0.04 wt %, about 0.03 wt %, about 0.02 wt %, about 0.01 wt %, and ranges including and between any two of these values or below any one of these values. Such low values of oxygenates can be detected through appropriate analytical techniques, including but not limited to Instrumental Neutron Activation Analysis.

The composition includes less than about 0.1 wt % of aromatics. The composition may contain aromatics in the amount of about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, about 0.009 wt %, about 0.008 wt %, about 0.007 wt %, about 0.006 wt %, about 0.005 wt %, about 0.004 wt %, about 0.003 wt %, about 0.002 wt %, about 0.001 wt %, and ranges including and between any two of these values or less than any one of these values. In any embodiment therein, it may be that the composition includes no detectable aromatics. By "detectable" as used throughout herein is meant detection on commercially available detection instruments as of May 11, 2016. The composition may contain less than about 0.01 wt % benzene. The composition may contain benzene in the amount of about 0.008 wt %, about 0.006 wt %, about 0.004 wt %, about 0.002 wt %, about 0.001 wt %, about 0.0008 wt %, about 0.0006 wt %, about 0.0004 wt %, about 0.0002 wt %, about 0.0001 wt %, about 0.00008 wt %, about 0.00006 wt %, about 0.00004 wt %, about 0.00002 wt %, about 0.00001 wt % and ranges including and between any two of these values or less than any one of these values. Such low values of benzene may be determined through appropriate analytical techniques, including but not limited to two dimensional gas chromatography of the composition. In any embodiment therein, it may be that the composition includes no detectable benzene. The very low aromatics content of the compositions are especially appealing when the composition is used as a charcoal lighter fluid, as the lack of aromatic compounds prevents formation of PAHs. In contrast to the health concerns surrounding, e.g., petroleum-derived charcoal lighter fluids, the compositions of the present technology present little to no risk for generating PAHs that may be inhaled or end up in food.

The composition may have a sulfur content less than about 5 wppm. The composition may have a sulfur content of about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, and ranges including and between any two of these values or less than any one of these values.

The composition includes at least about 70 wt % even carbon number paraffins. Thus, the composition may include even carbon number paraffins in an amount of about 70 wt %, about 71 wt %, about 72 wt %, about 73 wt %, about 74 wt %, about 75 wt %, about 76 wt %, about 78 wt %, about 80 wt %, about 82 wt %, about 84 wt %, about 86 wt %, about 88 wt %, about 90 wt %, about 91 wt %, about 92 wt %, about 93 wt %, about 94 wt %, about 95 wt %, about 96 wt %, about 97 wt %, about 98 wt %, about 99 wt %, about 99.2 wt %, about 99.4 wt %, about 99.5 wt %, about 99.6 wt %, about 99.7 wt %, about 99.8 wt %, about 99.9 wt %, about 99.99 wt %, about 100 wt %, or any range including and in-between any two of these values. The composition may include at least about 70 wt % even carbon number n-paraffins; the composition may include even carbon number n-paraffins in an amount of about 70 wt %, about 71 wt %, about 72 wt %, about 73 wt %, about 74 wt %, about 75 wt %, about 76 wt %, about 78 wt %, about 80 wt %, about 82 wt %, about 84 wt %, about 86 wt %, about 88 wt %, about 90 wt %, about 91 wt %, about 92 wt %, about 93 wt %, about 94 wt %, about 95 wt %, about 96 wt %, about 97 wt %, about 98 wt %, about 99 wt %, about 99.2 wt %, about 99.4 wt %, about 99.5 wt %, about 99.6 wt %, about 99.7 wt %, about 99.8 wt %, about 99.9 wt %, about 99.99 wt %, about 100 wt %, or any range including and in-between any two of these values. Such compositions are especially well suited as relatively low-temperature phase change materials.

The composition of any embodiment herein may include one or more of a $C_7$ paraffin, a $C_9$ paraffin, or a $C_{11}$ paraffin. The composition of any embodiment herein may further include each of a $C_7$ paraffin, a $C_9$ paraffin, and a $C_{11}$ paraffin. In any embodiment herein, the weight ratio of Cu paraffins to $C_7$ paraffins may be about 150:1 or greater. In any embodiment herein, the weight ratio of $C_{12}$ paraffins to $C_9$ paraffins may be about 10:1 or greater. In any embodiment herein, the weight ratio of $C_{12}$ paraffins to $C_{11}$ paraffins may be from about 3.0:1 to about 1.2:1. In any embodiment herein, the weight ratio of $C_{10}$ paraffins to $C_7$ paraffins may be about 150:1 or greater. In any embodiment herein, the weight ratio of $C_{10}$ paraffins to $C_9$ paraffins may be about 10:1 or greater. In any embodiment herein, the weight ratio of $C_{10}$ paraffins to $C_{11}$ paraffins may be from about 2.0:1 to about 0.5:1. In any embodiment herein, the weight ratio of Cu paraffins to $C_{10}$ paraffins may be from about 2.0:1 to about 0.5:1.

In any embodiment herein, it may be that there are less than about 0.5 wt % paraffins with greater than 12 carbon atoms. It may be that the amount of paraffins with greater than 12 carbon atoms is about 0.4 wt %, about 0.3 wt %, about 0.2 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, or any range including and between any two of these values or less than any one of these values. In any embodiment herein, it may be that there are less than about 0.5 wt % isoparaffins with greater than 12 carbon atoms. It may be that the amount of isoparaffins with greater than 12 carbon atoms is about 0.4 wt %, about 0.3 wt %, about 0.2 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, or any range including and between any two of these values or less than any one of these values. In any embodiment herein, it may be that there are less than about 0.5 wt % n-paraffins with greater than 12 carbon atoms. It may be that the amount of n-paraffins with greater than 12 carbon atoms is about 0.4 wt %, about 0.3 wt %, about 0.2 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, or any range including and between any two of these values or less than any one of these values. Such low values may be determined through appropriate analytical techniques, including but not limited to two dimensional gas chromatography of the composition. In any embodiment therein, it may be that the composition includes no detectable n-paraffins with greater than 12 carbon atoms.

In any embodiment herein, the composition may be produced by a process that includes hydrotreating a biorenewable feedstock comprising at least one of palm kernel oil, coconut oil, babassu oil, microbial oil, or algal oil. The composition may be produced by a process that includes hydrotreating a biorenewable feedstock comprising at least two or more of palm kernel oil, coconut oil, babassu oil, microbial oil, or algal oil. The composition may be produced by a process that includes distillation; the composition may be produced by a process that excludes distillation. Such processes may include any embodiment of the methods of the present technology described herein. The composition may be produced by a process that includes distillation; the composition may be produced by a process that excludes distillation.

The composition of any embodiment herein may be suitable as a diesel fuel, a diesel fuel additive, a diesel fuel blendstock, a turbine fuel, a turbine fuel additive, a turbine fuel blendstock, an aviation fuel, an aviation fuel additive, an aviation fuel blendstock, a fuel for portable heaters, a fuel for portable generators, a charcoal lighter fluid, or a combination of any two or more thereof. It may be that the composition is suitable for use as a diesel fuel, a diesel fuel blendstock (e.g., a winter diesel according to EN 590; an arctic diesel fuel according to EN 590), an aviation fuel, or a combination thereof. For example, it may be the composition is suitable for use as a commercial jet fuel meeting industry standards (e.g., ASTM D1655 and/or ASTM D7566). In any embodiment herein, the composition may include a flash point from about 100° F. (about 38° C.) to about 136° F. (about 58° C.). The flash point of the composition may be about 100° F. (about 38° C.), about 102° F. (about 39° C.), about 104° F. (about 40° C.), 106° F. (about 41° C.), about 108° F. (about 42° C.), about 110° F. (about 43° C.), about 111° F. (about 44° C.), about 113° F. (about 45° C.), about 115° F. (about 46° C.), about 117° F. (about 47° C.), about 118° F. (about 49° C.), about 122° F. (about 50° C.), about 124° F. (about 51° C.), about 126° F. (about 52° C.), about 127° F. (about 53° C.), about 129° F. (about 54° C.), about 131° F. (about 55° C.), about 133° F. (about 56° C.), about 135° F. (about 57° C.), about 136° F. (about 58° C.), or any range including and in between any two of these values. Thus, for example, in any embodiment herein the composition may include a flash point from about 100° F. (about 38° C.) to about 118° F. (about 49° C.).

The composition of any embodiment herein may include a cloud point from about −10° C. to about −60° C. The cloud point of the composition may be about −10° C., about −12° C., about −14° C., about −16° C., about −18° C., about −20° C., about −22° C., about −24° C., about −26° C., about −28° C., about −30° C., about −32° C., about −34° C., about −36° C., about −38° C., about −40° C., about −42° C., about −44° C., about −46° C., about −48° C., about −50° C., about −52° C., about −54° C., about −56° C., about −58° C., about −60° C., and any range in between and including any two of these values or less than any one of these values.

The composition of any embodiment herein may include a freeze point less than about −40° C., especially for compositions suitable as aviation fuels; thus the composition may include a freeze point of about −40° C., about −42° C., about −44° C., about −46° C., about −48° C., about −50° C., about −52° C., about −54° C., about −56° C., about −58° C., about −60° C., about −62° C., about −64° C., about −66° C., about −68° C., about −70° C., and any range in between and including any two of these values or less than any one of these values.

In a related aspect, a charcoal heating material is provided that includes charcoal, where the charcoal includes wood char and a binder and the wood char has an exterior surface, where the charcoal heating material includes a composition of any embodiment described herein disposed on at least a portion of the exterior surface of the charcoal. In being disposed on the exterior surface, this does not necessarily mean the entirety of the exterior surface is, e.g., coated with the composition. It may be a portion or portions of the exterior surface are associated with the composition. The charcoal of the charcoal heating material may include a plurality of pores within the charcoal. The composition may further be disposed within at least a portion of the plurality of pores. As described in reference to the exterior surface, the entirety of each pores may not be associated with the composition; the composition may be disposed in at least a portion of each pore that includes the composition. A "portion" of the exterior surface means from about 1% to about 100% by surface area of the exterior surface, or any range including or in between any two integers from about 1% to about 100%. A "portion of the plurality of pores" means from about 1% to about 100% of the pores in the charcoal, or any range including or in between any two integers from about 1% to about 100%. A "portion" of a pore means from about 1% to about 100% by surface area of the pore, or any range including or in between any two integers from about 1% to about 100%.

"Wood char" (also termed "char") refers to the hard fibrous substance that makes up the greater part of the stems, branches, and roots of trees or shrubs beneath the bark, which has been subjected to pyrolysis so as to convert the material to at least some extent to carbon. Thus, char is a comprehensive term, and includes retort chars, kiln chars, etc. Binders for such charcoal heating materials refers to materials that possess adhesive qualities that produce or promote the holding together of loosely aggregated components, where such binders may include, but are not limited to, a starch (such as a starch from corn, milo, and/or wheat) or other complex carbohydrates or a combination of any two or more thereof.

The charcoal heating material may include an ignition aid in addition to the composition of the present technology. Such ignition aids refer to materials that are useful in the act or process of initiating combustion and may include, but are not limited to, sawdust, fines resulting from char production, other particulate cellulosic matter, and combinations of any two or more thereof.

The charcoal heating material may be in the form of a charcoal briquette, log, cube, or other geometric form. Discussion of suitable methods for generating charcoal heating materials includes, but is not limited to, U.S. Pat. Nos. 5,762,656, 5,049,333, and 9,279,091.

In a related aspect, a method is provided for producing the composition of any embodiment herein. The method includes contacting a feed stream, where the feed stream includes a biorenewable feedstock, with a hydrotreatment catalyst in a fixed bed hydrotreatment reactor to produce a hydrotreated product, where the biorenewable feedstock comprises at least one of palm kernel oil, coconut oil, babassu oil, microbial oil, or algal oil. The method may further include fractionating the hydrotreated product to produce the composition. In any embodiment herein, it may be that the feed stream does not include a petroleum-based feedstock. The fixed bed hydrotreatment reactor is at a temperature less than about 750° F. (400° C.), and is at a pressure from about 200 psig (13.8 barg) to about 4,000 psig (275 barg). The fixed bed hydrotreatment reactor may be a continuous fixed bed hydrotreatment reactor.

The fixed bed reactor is at a temperature less than about 750° F. (400° C.). In some embodiments, the fixed bed reactor is at a temperature falling in the range from about 480° F. (250° C.) to about 750° F. (400° C.). The fixed bed reactor may operate at a temperature of about 450° F. (230° C.), about 500° F. (260° C.), about 540° F. (280° C.), about 570° F. (300° C.), about 610° F. (320° C.), about 645° F. (340° C.), about 680° F. (360° C.), about 720° F. (380° C.), about 750° F. (400° C.), or any range including and in between any two of these values. A weighted average bed temperature (WABT) is commonly used in fixed bed, adiabatic reactors to express the "average" temperature of the reactor which accounts for the nonlinear temperature profile between the inlet and outlet of the reactor.

$$WABT = \sum_{i=1}^{N}(WABT_i)(Wc_i)$$

-continued $$WABT_i = \frac{T_i^{in} + 2T_i^{out}}{3}$$

In the equation above, $T_i^{in}$ and $T_i^{out}$ refer to the temperature at the inlet and outlet, respectively, of catalyst bed i. As shown, the WABT of a reactor system with N different catalyst beds may be calculated using the WABT of each bed ($WABT_i$) and the weight of catalyst in each bed ($Wc_i$).

The feed stream is combined with a hydrogen-rich treat gas. The ratio of hydrogen-rich treat gas to biorenewable feedstock is in the range of about 2,000 to about 10,000 SCF/bbl (in units of normal liter of gas per liter of liquid (Nl/l), about 355 Nl/l to about 1780 Nl/l). The ratio of hydrogen-rich treat gas to biorenewable feedstock may be about 2,500 SCF/bbl (about 445 Nl/l), about 3,000 SCF/bbl (about 535 Nl/l), about 3,500 SCF/bbl (about 625 Nl/l), about 4,000 SCF/bbl (about 710 Nl/l), about 4,500 SCF/bbl (about 800 Nl/l), about 5,000 SCF/bbl (about 890 Nl/l), about 5,500 SCF/bbl (about 980 Nl/l), about 6,000 SCF/bbl (about 1070 Nl/l), about 6,500 SCF/bbl (about 1160 Nl/l), about 7,000 SCF/bbl (about 1250 Nl/l), about 7,500 SCF/bbl (about 1335 Nl/l), about 8,000 SCF/bbl (about 1425 Nl/l), about 8,500 SCF/bbl (about 1515 Nl/l), about 9,000 SCF/bbl (about 1600 Nl/l), about 9,500 SCF/bbl (about 1690 Nl/l), and ranges including and in between any two of these values. The hydrogen-rich treat gas contains from about 70 mol % to about 100 mol % hydrogen. In terms of mass ratio, the ratio of the feed stream to hydrogen-rich treat gas is from about 5:1 to 25:1. The ratio of the feed stream to hydrogen-rich treat gas may be about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, about 22:1, about 23:1, about 24:1, and ranges including and in between any two of these values or greater than any one of these values.

In some embodiments, the fixed bed reactor includes a hydrogenation catalyst. The hydrogenation catalyst may include Co, Mo, Ni, Pt, Pd, Ru, W, NiMo, NiW, CoMo, or combinations of any two or more thereof. In some embodiments, the hydrogenation catalyst includes NiMo, NiW, CoMo, and combinations of any two or more thereof. Supports for the hydrogenation catalyst include alumina and alumina with silicon oxides and/or phosphorus oxides. It should be noted that one of ordinary skill in the art can select an appropriate hydrogenation catalyst to provide a particular result and still be in accordance with the present technology.

The fixed bed reactor includes a hydrotreatment catalyst. The hydrotreatment catalyst may include Co, Mo, Ni, Pt, Pd, Ru, W, NiMo, NiW, CoMo, or combinations of any two or more thereof. The hydrotreatment catalyst may preferably include NiMo, NiW, CoMo, and combinations of any two or more thereof. Supports for the hydrotreatment catalyst include alumina and alumina with silicon oxides and/or phosphorus oxides. It should be noted that one of ordinary skill in the art can select an appropriate hydrotreatment catalyst to provide a particular result and still be in accordance with the present technology.

To maintain the active metal sulfide functionality of the hydrotreatment catalyst despite the negligible presence of organic sulfur in most biorenewable feedstocks, the feed stream may be supplemented with a sulfur compound that decomposes to hydrogen sulfide when heated and/or contacted with a catalyst. In some embodiments, the sulfur compound includes methyl mercaptan, ethyl mercaptan, n-butyl mercaptan, dimethyl sulfide (DMS), dimethyl disulfide (DMDS), dimethylsulfoxide (DMSO), diethyl sulfide, di-tert-butyl polysulfide (TBPS), di-octyl polysulfide, di-tert-nonyl polysulfude (TNPS), carbon disulfide, thiophene, or mixtures of any two or more thereof. The concentration of the sulfur compound in the feed stream may be from about 50 ppm to about 2,000 ppm by weight sulfur. The feed stream may include a fossil-fuel fraction wherein the fossil-fuel fraction provides the sulfur, either in combination with or in the absence of the above mentioned sulfur compounds.

The fixed bed reactor is at a pressure falling in the range from about 200 psig (about 13.8 barg) to about 4,000 psig (about 275 barg). The pressure may be about 300 psig (21 barg), about 400 psig (28 barg), about 500 psig (34 barg), about 600 psig (41 barg), about 700 psig (48 barg), about 800 psig (55 barg), about 900 psig (62 barg), about 1,000 psig (69 barg), about 1,100 psig (76 barg), about 1,200 psig (83 barg), about 1,300 psig (90 barg), about 1,400 psig (97 barg), about 1,500 psig (103 barg), about 1,600 psig (110 barg), about 1,700 psig (117 barg), about 1,800 psig (124 barg), about 1,900 psig (131 barg), about 2,000 psig (138 barg), about 2,200 psig (152 barg), about 2,400 psig (165 barg), about 2,600 psig (179 barg), about 2,800 psig (193 barg), about 3,000 psig (207 barg), about 3,200 psig (221 barg), about 3,400 psig (234 barg), about 3,600 psig (248 barg), about 3,800 psig (262 barg), about 3,900 psig (269 barg), and any ranges including and in between any two of these values. In some embodiments, the pressure is from about 1,000 psig (69 barg) to about 2,000 psig (138 barg).

In some embodiments, the feed stream further comprises a diluent. The diluent may include a recycled hydroprocessed product (e.g., the hydrotreated product), a distilled fraction of the hydrotreated product, a petroleum hydrocarbon fluid, a synthetic hydrocarbon product stream from a Fischer-Tropsch process, a hydrocarbon product stream produced by fermentation of sugars (e.g. farnesene), natural hydrocarbons such as limonene and terpene, natural gas liquids, or mixtures of any two or more thereof. In some embodiments, the diluent includes a recycled hydrotreated product, a distilled fraction of the hydrotreated product, a petroleum hydrocarbon fluid, or mixtures of two or more thereof. The ratio of diluent to biorenewable feedstock falls within the range from about 0.5:1 to about 20:1. The ratio of diluent to biorenewable feedstock may be about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, and ranges including and between any two of these values.

In some embodiments, the hydrotreated product contains less than about 7.0 wt % cycloparaffins. The hydrotreated product may have cycloparaffins in the amount of about 6 wt %, about 5 wt %, about 4 wt %, about 3 wt %, about 2 wt %, about 1 wt %, about 0.9 wt %, about 0.8 wt %, about 0.7 wt %, about 0.6 wt %, about 0.5 wt %, about 0.4 wt %, about 0.3 wt %, about 0.2 wt %, about 0.1 wt %, and any range including and in between any two of these values or below any one of these values.

In some embodiments, the hydrotreated product contains less than about 1.0 wt % aromatics, and may contain from about 1.0 wt % to about 0.001 wt % aromatics. The hydrotreated product may contain aromatics in the amount of about 0.9 wt %, about 0.8 wt %, about 0.7 wt %, about 0.6 wt %, about 0.5 wt %, about 0.4 wt %, about 0.3 wt %, about 0.2 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, about 0.009 wt %, about 0.008 wt %, about 0.007 wt %, about 0.006 wt %, about 0.005 wt %, about 0.004 wt %, about 0.003 wt %, about 0.002 wt %, about 0.001 wt %, and ranges including and between any two of these values or below any one of these values. In some embodiments, the hydrotreated product contains less than about 0.5 wt % total aromatics. In some embodiments, the hydrotreated product has less than about 0.01 wt % benzene. The hydrotreated product may contain benzene in the amount of about 0.008 wt %, about 0.006 wt %, about 0.004 wt %, about 0.002 wt %, about 0.001 wt %, about 0.0008 wt %, about 0.0006 wt %, about 0.0004 wt %, about 0.0002 wt %, about 0.0001 wt %, about 0.00008 wt %, about 0.00006 wt %, about 0.00004 wt %, about 0.00002 wt %, about 0.00001 wt % and ranges including and between any two of these values or less than any one of these values. Such low values of benzene may be determined through appropriate analytical techniques, including but not limited to two dimensional gas chromatography of the composition. In some embodiments, the hydrotreated product has less than about 0.00001 wt % of benzene.

In some embodiments, the hydrotreated product has a sulfur content less than about 5 wppm. The hydrotreated product may have a sulfur content of about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, and ranges including and between any two of these values or less than any one of these values. In some embodiments, the hydrotreated product has a sulfur content less than about 2 wppm.

In some embodiments, the hydrotreated product has less than about 0.1 wt % oxygenates. The hydrotreated product may have oxygenates in the amount of about 0.09 wt %, about 0.08 wt %, about 0.07 wt %, about 0.05 wt %, about 0.04 wt %, about 0.03 wt %, about 0.02 wt %, about 0.01 wt %, and ranges including and between any two of these values or below any one of these values. Such low values of oxygenates can be detected through appropriate analytical techniques, including but not limited to Instrumental Neutron Activation Analysis.

In some embodiments, the biorenewable feedstock may be pretreated. Such pretreatments include, but are not limited to, degumming, neutralization, bleaching, deodorizing, or a combination of any two or more thereof. One type of degumming is acid degumming, which involves contacting the fat/oil with concentrated aqueous acids. Exemplary acids are phosphoric, citric, and maleic acids. This pretreatment step removes metals such as calcium and magnesium in addition to phosphorus. Neutralization is typically performed by adding a caustic (referring to any base, such as aqueous NaOH) to the acid-degummed fat/oil. The process equipment used for acid degumming and/or neutralization may include high shear mixers and disk stack centrifuges. Bleaching typically involves contacting the degummed fat/oil with adsorbent clay and filtering the spent clay through a pressure leaf filter. Use of synthetic silica instead of clay is reported to provide improved adsorption. The bleaching step removes chlorophyll and much of the residual metals and phosphorus. Any soaps that may have been formed during the caustic neutralization step (i.e. by reaction with free fatty acids) are also removed during the bleaching step. The aforementioned treatment processes are known in the art and described in the patent literature, including but not limited to U.S. Pat. Nos. 4,049,686, 4,698,185, 4,734,226, and 5,239,096.

Bleaching as used herein is a filtration process common to the processing of glyceride oils. Many types of processing configurations and filtration media such as diatomaceous earth, perlite, silica hydrogels, cellulosic media, clays, bleaching earths, carbons, bauxite, silica aluminates, natural fibers and flakes, synthetic fibers and mixtures thereof are known to those skilled in the art. Bleaching can also be referred to by other names such as clay treating which is a common industrial process for petroleum, synthetic and biological feeds and products.

Additional types of filtration may be performed to remove suspended solids from the biorenewable feedstock before and/or after and/or in lieu of degumming and/or bleaching. In some embodiments, rotoscreen filtration is used to remove solids larger than about 1 mm from the biorenewable feedstock. Rotoscreen filtration is a mechanically vibrating wire mesh screen with openings of about 1 mm or larger that continuously removes bulk solids. Other wire mesh filters of about 1 mm or larger housed in different types of filter may be also be employed, including self-cleaning and backwash filters, so long as they provide for bulk separation of solids larger than 1 mm, such as from about 1 mm to about 20 mm. In embodiments where bleaching through clay-coated pressure leaf filter is not used, cartridge or bag filters with micron ratings from about 0.1 to about 100 may be employed to ensure that only the solubilized and or finely suspended (e.g. colloidal phase) adulterants are present in the feed stream. Filtration is typically performed at temperatures high enough to ensure the feed stream is a liquid of about 0.1 to 100 cP viscosity. This generally translates into a temperature range of 20° C. to 90° C. (about 70° F. to about 195° F.

In some embodiments, the liquid hourly space velocity (LHSV) of the biorenewable feedstock through the fixed bed hydrotreatment reactor is from about 0.2 $h^{-1}$ to about 10.0 $h^{-1}$. The LHSV may be about 0.3 $h^{-1}$, about 0.4 $h^{-1}$, about 0.5 $h^{-1}$, about 0.6 $h^{-1}$, about 0.7 $h^{-1}$, about 0.8 $h^{-1}$, about 0.9 $h^{-1}$, about 1.0 $h^{-1}$, about 1.2 $h^{-1}$, about 1.4 $h^{-1}$, about 1.6 $h^{-1}$, about 1.8 $h^{-1}$, about 2.0 $h^{-1}$, about 2.2 $h^{-1}$, about 2.4 $h^{-1}$, about 2.6 $h^{-1}$, about 2.8 $h^{-1}$, about 3.0 $h^{-1}$, about 3.2 $h^{-1}$, about 3.4 $h^{-1}$, about 3.6 $h^{-1}$, about 3.8 $h^{-1}$, about 4.0 $h^{-1}$, about 4.2 $h^{-1}$, about 4.4 $h^{-1}$, about 4.6 $h^{-1}$, about 4.8 $h^{-1}$, about 5.0 $h^{-1}$, about 5.2 $h^{-1}$, about 5.4 $h^{-1}$, about 5.6 $h^{-1}$, about 5.8 $h^{-1}$, about 6.0 $h^{-1}$, about 6.2 $h^{-1}$, about 6.4 $h^{-1}$, about 6.6 $h^{-1}$, about 6.8 $h^{-1}$, about 7.0 $h^{-1}$, about 7.2 $h^{-1}$, about 7.4 $h^{-1}$, about 7.6 $h^{-1}$, about 7.8 $h^{-1}$, about 8.0 $h^{-1}$, about 8.2 $h^{-1}$, about 8.4 $h^{-1}$, about 8.6 $h^{-1}$, about 8.8 $h^{-1}$, about 9.0 $h^{-1}$, about 9.2 $h^{-1}$, about 9.4 $h^{-1}$, about 9.6 $h^{-1}$, about 9.8 $h^{-1}$, and ranges including and between any two of these values or above any one of these values.

The biorenewable feedstock includes free fatty acids, fatty acid esters (including mono-, di-, and triglycerides), or combinations thereof. For example, the free fatty acids may include free fatty acids obtained by stripping free fatty acids from a triglyceride transesterification feedstock. The biorenewable feedstock may include (in addition to at least one of palm kernel oil, coconut oil, babassu oil, microbial oil, or algal oil) animal fats, animal oils, plant fats, plant oils, vegetable fats, vegetable oils, greases, or mixtures of any two or more thereof. The fatty acid esters may include fatty acid methyl ester, a fatty acid ethyl ester, a fatty acid propyl ester, a fatty acid butyl ester, or mixtures of any two or more thereof. The biorenewable feedstock may include the fatty acid distillate from vegetable oil deodorization. Depending on level of pretreatment, fats, oils, and greases, may contain between about 1 wppm and about 1,000 wppm phosphorus, and between about 1 wppm and about 500 wppm total metals (mainly sodium, potassium, magnesium, calcium, iron, and copper). Plant and/or vegetable oils and/or microbial oils include, but are not limited to, babassu oil, carinata oil, soybean oil, canola oil, coconut oil, rapeseed oil, tall oil, tall oil fatty acid, palm oil, palm oil fatty acid distillate, jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These may be classified as crude, degummed, and RBD (refined, bleached, and deodorized) grade, depending on level of pretreatment and residual phosphorus and metals content. However, any of these grades may be used in the present technology. Animal fats and/or oils as used above includes, but is not limited to, inedible tallow, edible tallow, technical tallow, floatation tallow, lard, poultry fat, poultry oils, fish fat, fish oils, and mixtures of any two or more thereof. Greases may include, but are not limited to, yellow grease, brown grease, waste vegetable oils, restaurant greases, trap grease from municipalities such as water treatment facilities, and spent oils from industrial packaged food operations, and mixtures of any two or more thereof.

The biorenewable feedstock may include (in addition to at least one of palm kernel oil, coconut oil, babassu oil, microbial oil, or algal oil) animal fats, poultry oil, soybean oil, canola oil, carinata oil, rapeseed oil, palm oil, jatropha oil, castor oil, camelina oil, seaweed oil, halophile oils, rendered fats, restaurant greases, brown grease, yellow grease, waste industrial frying oils, fish oils, tall oil, tall oil fatty acids, or mixtures of any two or more thereof. The biorenewable feedstock may include (in addition to at least one of palm kernel oil, coconut oil, babassu oil, microbial oil, or algal oil) animal fats, restaurant greases, brown grease, yellow grease, waste industrial frying oils, or mixtures of any two or more thereof.

The hydrotreatment product may be fractionated to provide the composition. In any embodiment herein, it may be that the fractionation step provides the composition. In any embodiment herein, it may be that the fractionation step provides two or more $C_7$-$C_{12}$ paraffin fractions, where the method further includes combining the two or more $C_7$-$C_{12}$ paraffin fractions to produce the composition. The fractionation may be conducted in a distillation column equipped with a reboiler or stripping steam in the bottom of the column, and a condenser at the top. In such embodiments, the reboiler or stripping steam provide the thermal energy to vaporize the heavier fraction of the hydrocarbons while the condenser cools the lighter hydrocarbon vapors to return hydrocarbon liquid back into the top of the column. The distillation column is equipped with a plurality of features (e.g., plates, protrusions, and/or beds of packing material) wherein the rising vapor and falling liquid come into counter-current contact. The column's temperature profile from bottom to top is dictated by the composition of the hydrocarbon feed and the column pressure. In some embodiments, column pressures range from about 200 psig (about 13.8 barg) to about −14.5 psig (about −1 barg). The column is equipped with one or a plurality of feed nozzles. A portion of the condenser liquid (typically 10 to 90 vol %) is drawn off as overhead distillate product while the rest is allowed to reflux back to the column. While some embodiments employ a plurality of draw-off nozzles to fractionate the feed into multiple cuts in the same column, other embodiments achieve the same separation using a plurality of columns in series, each separating the feed into an overhead fraction and a bottom fraction.

The method may further include fractionating the hydrotreated product to produce the composition and a $C_{14}$-$C_{22}$ n-paraffin fraction. The $C_{14}$-$C_{22}$ n-paraffin fraction includes at least about 90 wt % $C_{14}$-$C_{22}$ n-paraffin fraction.

The $C_{14}$-$C_{22}$ n-paraffin fraction may include at least about 90 wt % $C_{14}$-$C_{16}$ n-paraffins. The $C_{14}$-$C_{22}$ n-paraffin fraction may include at least about 90 wt % $C_{14}$-$C_{18}$ n-paraffins. The $C_{14}$-$C_{22}$ n-paraffin fraction may include at least about 90 wt % $C_{16}$-$C_{18}$ n-paraffins. The $C_{14}$-$C_{22}$ n-paraffin fraction may include at least about 90 wt % $C_{18}$-$C_{20}$ n-paraffins. The $C_{14}$-$C_{22}$ n-paraffin fraction may include at least about 90 wt % n-tetradecane. The $C_{14}$-$C_{22}$ n-paraffin fraction may include at least about 90 wt % n-hexadecane. The $C_{14}$-$C_{22}$ n-paraffin fraction may include at least about 90 wt % n-octadecane. The $C_{14}$-$C_{22}$ n-paraffin fraction may include at least about 90 wt % n-icosane (note that n-icosane is also known as "n-eicosane"). The $C_{14}$-$C_{22}$ n-paraffin fraction may include at least about 90 wt % n-docosane. In any embodiment herein, the $C_{14}$-$C_{22}$ n-paraffin fraction(s) may have an aromate, oxygenate, and sulfur content as described herein for the hydrotreated product. In any embodiment herein, the $C_{14}$-$C_{22}$ n-paraffin fraction(s) are suitable as a phase change material, e.g., for thermal systems.

In any embodiment herein, the method may further include fractionating the hydtrotreated product to produce the composition and two or more $C_{14}$-$C_{22}$ n-paraffin fractions, where the two or more $C_{14}$-$C_{22}$ n-paraffin fractions may be of any embodiment described herein. Thus, the method may further include fractionating the hydtrotreated product to produce the composition as well as two or more of (i) a fraction including at least about 90 wt % n-tetradecane, (ii) a fraction may including at least about 90 wt % n-hexadecane, (iii) a fraction including at least about 90 wt % n-octadecane, (iv) a fraction including at least about 90 wt % n-icosane, and (v) a fraction including at least about 90 wt % n-docosane. In any embodiment herein, the two or more $C_{14}$-$C_{22}$ n-paraffin fractions are each independently suitable as a phase change material, e.g., for thermal systems.

In an aspect, a blended fuel is provided, where the blended fuel includes the composition of any embodiment described herein and a petroleum-based fuel and/or a synthetic fuel. The petroleum-based fuel and/or synthetic fuel may each independently be a diesel fuel, a turbine fuel, an aviation fuel, or a combination of any two or more thereof. The synthetic fuel includes a (1) fuel generated by a process that includes HDO of one or more biorenewable feedstocks to produce a HDO product, followed by HI of the HDO product; or (2) a fuel generated by a process that includes a Fischer-Tropsch process; or (3) a combination of (1) and (2). It may be that the blended fuel suitable for use as a diesel fuel (e.g., a winter diesel according to EN 590; an arctic diesel fuel according to EN 590), an aviation fuel, or a combination thereof. For example, it may be the blended fuel suitable for use as a commercial jet fuel meeting industry standards (e.g., ASTM D1655 and/or ASTM D7566). The blended fuel may be suitable for use as a diesel fuel, a turbine fuel, an aviation fuel, a fuel for portable heaters, a fuel for portable generators, and/or as a charcoal lighter fluid.

The blended fuel may include the composition in an amount of about 1 wt % to about 80 wt %; thus the composition may be included in an amount of about 1 wt %, about 2 wt %, about 3 wt %, about 4 wt %, about 5 wt %, about 6 wt %, about 7 wt %, about 8 wt %, about 9 wt %, about 10 wt %, about 12 wt %, about 14 wt %, about 16 wt %, about 18 wt %, about 20 wt %, about 22 wt %, about 24 wt %, about 26 wt %, about 28 wt %, about 30 wt %, about 32 wt %, about 34 wt %, about 36 wt %, about 38 wt %, about 40 wt %, about 42 wt %, about 44 wt %, about 46 wt %, about 48 wt %, about 50 wt %, about 52 wt %, about 54 wt %, about 56 wt %, about 58 wt %, about 60 wt %, about 62 wt %, about 64 wt %, about 66 wt %, about 68 wt %, about 70 wt %, about 72 wt %, about 74 wt %, about 76 wt %, about 78 wt %, about 80 wt %, and any range including and in between any two of these values or above any one of these values. Similarly, where it is easier in a given situation to use volume present ("vol %") instead of wt %, the blended fuel may include the composition in an amount of about 1 vol % to about 80 vol %; thus the composition may be included in an amount of about 1 vol %, about 2 vol %, about 3 vol %, about 4 vol %, about 5 vol %, about 6 vol %, about 7 vol %, about 8 vol %, about 9 vol %, about 10 vol %, about 12 vol %, about 14 vol %, about 16 vol %, about 18 vol %, about 20 vol %, about 22 vol %, about 24 vol %, about 26 vol %, about 28 vol %, about 30 vol %, about 32 vol %, about 34 vol %, about 36 vol %, about 38 vol %, about 40 vol %, about 42 vol %, about 44 vol %, about 46 vol %, about 48 vol %, about 50 vol %, about 52 vol %, about 54 vol %, about 56 vol %, about 58 vol %, about 60 vol %, about 62 vol %, about 64 vol %, about 66 vol %, about 68 vol %, about 70 vol %, about 72 vol %, about 74 vol %, about 76 vol %, about 78 vol %, about 80 vol %, and any range including and in between any two of these values or above any one of these values.

The blended fuel may include a cloud point less than about –10° C. The cloud point of the blended fuel may be about –10° C., about –12° C., about –14° C., about –16° C., about –18° C., about –20° C., about –22° C., about –24° C., about –26° C., about –28° C., about –30° C., about –32° C., about –34° C., about –36° C., about –38° C., about –40° C., about –42° C., about –44° C., about –46° C., about –48° C., about –50° C., about –52° C., about –54° C., about –56° C., about –58° C., about –60° C., and any range in between and including any two of these values or less than any one of these values. Such cloud points are well suited for diesel fuels, with lower cloud points especially suitable for winter and arctic diesel fuels. The blended fuel may include a freeze point less than about –40° C., especially for blended fuels suitable as aviation fuels; thus the blended fuel may include a freeze point of about –40° C., about –42° C., about –44° C., about –46° C., about –48° C., about –50° C., about –52° C., about –54° C., about –56° C., about –58° C., about –60° C., about –62° C., about –64° C., about –66° C., about –68° C., about –70° C., and any range in between and including any two of these values or less than any one of these values.

In a related aspect, a method is provided for producing a blended fuel of any embodiment herein, where the method includes combining the composition of any embodiment described herein and a petroleum-based fuel and/or a synthetic fuel.

The present technology, thus generally described, will be understood more readily by reference to the following examples, which are provided by way of illustration and are not intended to be limiting of the present technology.

EXAMPLES

Example 1—Generation of a Biorenewable Synthetic n-Paraffinic Kerosene

A fixed-bed pilot plant tubular hydroprocessing reactor was loaded with Mo catalyst. The catalyst was in the oxide form when loaded and was sulfided during reactor startup.

The feedstock processed was a palm kernel oil ("PKO"). The reactor was pressurized with hydrogen and controlled at about 1,000 psig pressure (69 barg). The feedstock was introduced to the reactor under simulated product recycle conditions of 2:1 ratio (vol product recycle:vol feedstock) at a reactor inlet temperature of about 550° F. (288° C.). The product recycle was the product of the HDO reaction after separation of water. Hydrogen was introduced to the reactor at a rate of 5,000 SCF/bbl (890 Nl/l) along with the feed and product recycle, and the reactor operated at a liquid hourly space velocity (LHSV) of 1 h$^{-1}$.

The product was analyzed by GC and shown to be mainly a $C_{10}$-$C_{18}$ hydrocarbon composition, with 93% even carbon number n-paraffins, mainly even carbon number n-paraffins including decane, dodecane, tetradecane, hexadecane, and octadecane. The composition was analyzed for elemental oxygen and found to contain 0.2% or less oxygen.

The product was fractionated in a batch vacuum distillation column containing about 20 theoretical stages of Koch-Glitch DX structured packing. The first distillate cut was collected at a pot temperature of 75-95° C., overhead vapor temperature of 40-58° C., column pressure of about 5 mmHg, and reflux ratio of about 2:1-4:1.

This first distillate cut was weighed and was found to be about 24 wt % of the product charged to the distillation pot. This cut was then analyzed by GC-FID and found to possess the following composition.

| Component | wt % |
|---|---|
| n-$C_7$ | 0.162 |
| n-$C_8$ | 21.335 |
| n-$C_9$ | 2.017 |
| n-$C_{10}$ | 28.322 |
| n-$C_{11}$ | 20.580 |
| other $C_{11}$ hydrocarbons | 0.203 |
| n-$C_{12}$ | 27.217 |
| other $C_{13}$ hydrocarbons | 0.020 |
| other $C_{16}$ hydrocarbons | 0.023 |
| other $C_{17}$ hydrocarbons | 0.018 |
| other $C_{18}$ hydrocarbons | 0.104 |
| Aromatics | 0.00 |
| Oxygenates | 0.00 |
| Total | 100.00 |

Note: "other Cx hydrocarbons" refers to hydrocarbons that are not n-paraffins, such as olefins and/or iso-paraffins.

The flash point for this composition was measured and found to be 41.2° C., which is ideal for charcoal ignition fluid applications and portable fuel applications, as well as a suitable blendstock. Given that n-decane, n-undecane, and n-dodecane are the major components in the mixture, with respective flash points of 46° C., 62° C., and 71° C., and the composition is greater than 75 wt % $C_{10}$-$C_{12}$ hydrocarbons, the relatively low flash point of 41° C. is unexpected.

Example 2—Generation of a Biorenewable Synthetic n-Paraffinic Kerosene as a Jet-Fuel Blendstock An HDO reaction was performed as described in Example 1. Following generation of the HDO product, the product was fractionated in a batch vacuum distillation column containing about 20 theoretical stages of Koch-Glitch DX structured packing. A first distillate cut was collected at a pot temperature of 54-94 C ° C., overhead vapor temperature of 24-51° C., column pressure of about 2 mmHg, and reflux ratio of 3:1. A second distillate cut was collected at a pot temperature of 98° C., overhead vapor temperature of 51° C., column pressure of about 2 mmHg, and reflux ratio of about 3:1.

The flash point for the first distillate cut was measured and found to be 32.7° C. The first distillate cut was analyzed and found to possess at least about 98 wt % $C_7$-$C_{12}$ n-paraffins, no detectable oxygenates, no detectable aromatics, and no detectable n-paraffins with greater than 12 carbon atoms.

The flash point for the second distillate cut was measured and found to be 78.2° C. The second distillate cut was analyzed and found to possess at least about 98 wt % $C_7$-$C_{12}$ n-paraffins, no detectable oxygenates, no detectable aromatics, and no detectable n-paraffins with greater than 12 carbon atoms.

About 524 grams of the first distillate cut and about 1,094 grams of the second distillate cut were combined to provide a composition ("Composition A") with a density (at 15° C.) of 0.74516 g/cm$^3$, where the measured flash point was 51.9° C. and the average cloud point was measured to be about −20.9° C. (average cloud point based on five independent measurements). Initial analysis shows Composition A to have at least about 75 wt % n-paraffins. The D86 results are provided below.

| D86 Results for Composition A | |
|---|---|
| | ° C. |
| IBP | 162.2 |
| 5% | 178.9 |
| 10% | 184.6 |
| 20% | 191.9 |
| 30% | 195.2 |
| 40% | 200.9 |
| 50% | 203.5 |
| 60% | 205.7 |
| 70% | 207.5 |
| 80% | 209.2 |
| 90% | 210.5 |
| 95% | 211.2 |
| FBP | 223.8 |
| Residue | 1.10% |
| loss | 0.20% |

Because Composition A has a very high concentration of $C_7$-$C_{12}$ n-paraffins, one would expect the composition to possess an unsuitable density and flashpoint as lighter (lower boiling) linear hydrocarbons are known to have both lower densities and lower flash points. For example, n-octane has a flash point of 13° C. and a density of 0.703 g/cm$^3$. Surprisingly, Composition A has a density and a flash point that are both well above the minimum specification values for aviation fuels (density of 0.730 g/mL at 15° C. and flash point of 38° C.) as indicated in ASTM D7566 (Standard Specification for Aviation Fuels Containing Synthesized Hydrocarbons). Notably, Composition A is also suitable as a diesel fuel (e.g., a No. 1 Diesel according to ASTM D 975), a jet fuel blendstock, and a diesel fuel blendstock as well as a charcoal ignition fluid.

Example 3—Renewable Arctic Diesel

Generation of Renewable Diesel

A fixed-bed hydroprocessing reactor containing two catalyst beds was loaded with two types of hydrotreating catalyst. The bottom bed was filled with a high activity NiMo catalyst and the top bed with a lower activity Mo catalyst. Both catalysts were in the oxide form when loaded and were sulfided during reactor startup.

The feedstock processed was a mixture of commercially traded animal fats, vegetable oils (including used cooking oil), and greases (a "FOG" feed). The FOG feed had the following composition:

Used Cooking Oil: 46.2 wt %
Yellow Grease: 10.2 wt %
Beef Tallow: 39.2 wt %
Corn Oil: 4.4 wt %

The reactor was pressurized with hydrogen and controlled at about 1,800 psig pressure (124 barg). The feedstock was pumped to the reactor at a rate equivalent to 0.72 to 1.1 LHSV (vol/h FOG feed per vol NiMo catalyst). The feedstock was combined with heated hydrocarbon diluent to achieve a reactor inlet temperature within the 530° F. (277° C.) to 540° F. (282° C.) range. The hydrocarbon diluent was the product of the HDO reaction and which was combined with feed at about 3:1 ratio (vol diluent:vol feed). Hydrogen was introduced to the reactor at a rate of about 6,000 SCF/bbl FOG (890 Nl/l) along with the feed and diluent. Additional hydrogen was introduced to the reactor as quench gas between the top and bottom beds to control the outlet temperature to a value between 650° F. (343 C) to 680° F. (360° C.). The WABT of the reactor was thus between about 610° F. (321° C.) and 633° F. (334° C.). The hydrodeoxygenated (HDO) product was further processed via hydroisomerization and distillation to provide a hydrocarbon product meeting diesel fuel specifications ("FOG diesel").

Generation of Renewable Arctic Diesel Utilizing Composition A of Example 2

Generation of an arctic diesel was investigated by utilizing Composition A of Example 2. As shown in Table 1 below, the FOG diesel and Composition A were combined in different volumetric proportions and the cloud point analyzed. The number of cloud points indicated represent the number of independent measurements taken for the indicated composition.

TABLE 1

| Entry | FOG Diesel (Vol %) | Composition A (Vol. %) | Cloud Point (° C.) | Flash Point (° C.) | Density (at 15° C.) |
| --- | --- | --- | --- | --- | --- |
| 1 | 100 | 0 | −11/−11.5 | 72.9 | 0.78235 |
| 2 | 75 | 25 | −17.8/−17.7 | | |
| 3 | 50 | 50 | −24.9/−24.7 | | |
| 4 | 25 | 75 | −28.5/−28.6/−28.0 | | |
| 5 | 10 | 90 | −23.2/−23.5/−24.3 | | |
| 6 | 0 | 100 | −21.1/−19.4/−20.7/ −21.1/−22.4 | 51.9 | 0.74516 |

As illustrated in Table 1, when the FOG Diesel is mixed with Composition A of the present technology in a volumetric ratio of just 75:25 FOG Diesel:Composition A provides a cloud point meeting Class 1 arctic diesel standard for EN 590. A volumetric ratio of 50:50 FOG Diesel:Composition A provides a cloud point meeting Class 2 arctic diesel standard for EN 590. The lowest observed cloud point was at 25:75 FOG Diesel:Composition A, where this average cloud point of about −28.4° C. meets Class 3 arctic diesel standard for EN 590. Such results are surprising as most reductions in cloud point are achieved by mixing diesel with highly isoparaffinic compositions or other additives. However, the present technology surprisingly provides for a decrease in cloud point by increasing the amount of n-paraffins in the final composition (via addition of high n-paraffin content Composition A).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A composition comprising
   at least about 98 wt % $C_7$-$C_{12}$ n-paraffins, wherein at least about 10 wt % of composition comprises n-decane, at least about 20 wt % of the composition comprises n-dodecane, and at least about 75 wt % of composition comprises even carbon number paraffins.
   less about 0.1 wt % oxygenates;
   less than about 0.1 wt % aromatics.

B. The composition of Paragraph A, wherein at least about 75 wt % of composition comprises even carbon number n-paraffins.

C. The composition of Paragraph A or Paragraph B, wherein the composition comprises at least about 99 wt % $C_7$-$C_{12}$ n-paraffins.

D. The composition of any one of Paragraphs A-C, wherein the composition comprises at least about 99.5 wt % $C_7$-$C_{12}$ n-paraffins.

E. The composition of any one of Paragraphs A-D, wherein the composition comprises less than about 0.01 wt % oxygenates.

F. The composition of any one of Paragraphs A-E, wherein at least about 20 wt % of the composition comprises n-octane.

G. The composition of any one of Paragraphs A-F, wherein the weight ratio of $C_{12}$ paraffins to $C_7$ paraffins is about 150:1 or greater.

H. The composition of any one of Paragraphs A-G, wherein the weight ratio of $C_{12}$ paraffins to $C_9$ paraffins is about 10:1 or greater.

I. The composition of any one of Paragraphs A-H, the weight ratio of $C_{12}$ paraffins to $C_{11}$ paraffins is from about 3.0:1 to about 1.2:1.

J. The composition of any one of Paragraphs A-I, wherein the weight ratio of $C_{10}$ paraffins to $C_7$ paraffins is about 150:1 or greater.

K. The composition of any one of Paragraphs A-J, wherein the weight ratio of $C_{10}$ paraffins to $C_9$ paraffins is about 10:1 or greater.

L. The composition of any one of Paragraphs A-K, the weight ratio of $C_{10}$ paraffins to $C_{11}$ paraffins is from about 2.0:1 to about 0.5:1.

M. The composition of any one of Paragraphs A-L, the weight ratio of Cu paraffins to $C_{10}$ paraffins is from about 2.0:1 to about 0.5:1.

N. The composition of any one of Paragraphs A-M, wherein the composition is produced by hydrotreating a biorenewable feedstock comprising at least one of palm kernel oil, coconut oil, babassu oil, microbial oil, or algal oil.

O. The composition of any one of Paragraphs A-N, wherein the composition is suitable as a diesel fuel, a diesel fuel additive, a diesel fuel blendstock, a turbine fuel, a turbine fuel additive, a turbine fuel blendstock, an aviation fuel, an aviation fuel additive, an aviation fuel blendstock, a fuel for portable heaters, a fuel for portable generators, a charcoal lighter fluid, or a combination of any two or more thereof.

P. A charcoal heating material comprising
   a charcoal comprising
      wood char;
      a binder;
      an exterior surface of the charcoal; and
      optionally a plurality of pores within the charcoal; and
   a composition of any one of Paragraphs A-O disposed on at least the exterior surface of the charcoal.

Q. The charcoal heating material of Paragraph P, wherein the composition is further disposed within at least a portion of the plurality of pores.

R. The charcoal heating material of Paragraph P or Paragraph Q, wherein the charcoal further comprises one or more of sawdust and fines resulting from char production.

S. The charcoal heating material of any one of Paragraphs P-R, wherein the charcoal heating material is a charcoal briquette or a charcoal log.

T. A method of producing the composition of any one of Paragraphs A-O, the method comprising
   contacting a feed stream comprising a biorenewable feedstock with a hydrotreatment catalyst in a fixed bed hydrotreatment reactor to produce a hydrotreated product; and
   fractionating the hydrotreated product to produce the composition;
   wherein
      the biorenewable feedstock comprises at least one of palm kernel oil, coconut oil, babassu oil, microbial oil, or algal oil;
      the fixed bed hydrotreatment reactor
         is at a temperature less than about 750° F.; and
         is at a pressure from about 200 psig to about 4,000 psig.

U. The method of Paragraph T, wherein the liquid hourly space velocity of the biorenewable feedstock through the fixed bed hydrotreatment reactor is from about 0.2 $hr^{-1}$ to about 10.0 $hr^{-1}$.

V. The method of Paragraph T or Paragraph U, wherein the biorenewable feedstock further comprises animal fats, animal oils, plant fats, plant oils, vegetable fats, vegetable oils, or greases.

W. The method of any one of Paragraphs T-V, wherein the biorenewable feedstock further comprises one or more of animal fats, poultry oil, soybean oil, canola oil, carinata oil, rapeseed oils, palm oil, jatropha oil, castor oil, camelina oil, seaweed oil, halophile oils, rendered fats, restaurant greases, brown grease, yellow grease, waste industrial frying oils, fish oils, tall oil, and tall oil fatty acids.

X. The method of any one of Paragraphs T-W, wherein the biorenewable feedstock further comprises one or more of carinata oil, animal fats, restaurant greases, brown grease, yellow grease, and waste industrial frying oils.

Y. The method of any one of Paragraphs T-X, wherein the feed stream further comprises a diluent and the volume ratio of diluent to biorenewable feedstock falls within the range from about 0.5:1 to about 20:1.

Z. The method of any one of Paragraphs T-Y, wherein the method comprises fractionating the hydrotreated product to produce the composition and one or more $C_{14}$-$C_{22}$ n-paraffin fractions comprising at least about 90 wt % $C_{14}$-$C_{22}$ n-paraffins.

AA. The method of Paragraph Z, wherein the one or more $C_{14}$-$C_{22}$ n-paraffin fractions comprises a fraction comprising at least about 90 wt % $C_{14}$-$C_{16}$ n-paraffins.

AB. The method of Paragraph Z, wherein the one or more $C_{14}$-$C_{22}$ n-paraffin fractions comprises a fraction comprising at least about 90 wt % $C_{14}$-$C_{18}$ n-paraffins AC. The method of Paragraph Z, wherein the one or more $C_{14}$-$C_{22}$ n-paraffin fractions comprises a fraction comprising at least about 90 wt % $C_{16}$-$C_{18}$ n-paraffins AD. The method of Paragraph Z, wherein the one or more $C_{14}$-$C_{22}$ n-paraffin fractions comprises a fraction comprising at least about 90 wt % $C_{18}$-$C_{20}$ n-paraffins AE. The method of Paragraph Z, wherein the one or more $C_{14}$-$C_{22}$ n-paraffin fractions comprises a fraction comprising at least about 90 wt % n-tetradecane.

AF. The method of Paragraph Z or Paragraph AE, wherein the one or more $C_{14}$-$C_{22}$ n-paraffin fractions comprises a fraction comprising at least about 90 wt % n-hexadecane.

AG. The method of any one of Paragraphs Z, AE, and AF, wherein the one or more $C_{14}$-$C_{22}$ n-paraffin fractions comprises a fraction comprising at least about 90 wt % n-octadecane.

AH. The method of any one of Paragraphs Z and AE-AG, wherein the one or more $C_{14}$-$C_{22}$ n-paraffin fractions comprises a fraction comprising at least about 90 wt % n-icosane.

AI. The method of any one of Paragraphs Z and AE-AH, wherein the one or more $C_{14}$-$C_{22}$ n-paraffin fractions comprises a fraction comprising at least about 90 wt % n-docosane.

AJ. The method of any one of Paragraphs T-AI, wherein the method comprises fractionating the hydrotreated product to produce the composition and two or more $C_{14}$-$C_{22}$ n-paraffin fractions, wherein each $C_{14}$-$C_{22}$ n-paraffin fraction independently comprises at least about 90 wt % $C_{14}$-$C_{22}$ n-paraffins.

AK. The method of Paragraph AJ, wherein the two or more $C_{14}$-$C_{22}$ n-paraffin fractions comprise
a fraction comprising at least about 90 wt % n-tetradecane;
a fraction comprising at least about 90 wt % n-hexadecane; and
a fraction comprising at least about 90 wt % n-octadecane.

AL. The method of any one of Paragraphs Z-AK, wherein the one or more $C_{14}$-$C_{22}$ n-paraffin fractions is suitable as a phase change material.

AM. A phase change material comprising a $C_{14}$-$C_{22}$ n-paraffin fraction of any one of Paragraphs Z-AK, or a combination of any two or more $C_{14}$-$C_{22}$ n-paraffin fractions of any one of Paragraphs Z-AK.

AO. A blended fuel comprising
a composition of any one of Paragraphs A-O; and
a petroleum-based fuel and/or a synthetic fuel.

AP. The blended fuel of Paragraph AO, wherein the blended fuel comprises about 1 wt % to about 80 wt % of the composition.

AQ. The blended fuel of Paragraph AO or Paragraph AP, wherein the petroleum-based fuel and/or synthetic fuel may each independently be a diesel fuel, a turbine fuel, an aviation fuel, or a combination of any two or more thereof.

AR. The blended fuel of any one of Paragraphs AO-AQ, wherein the blended fuel comprises a cloud point less than about −10° C.

AS. The blended fuel of any one of Paragraphs AO-AR, wherein the blended fuel comprises a freeze point less than about −40° C.

AT. The blended fuel of any one of Paragraphs AO-AS, wherein the blended fuel is a diesel fuel, an aviation fuel, or a combination thereof.

AU. The blended fuel of any one of Paragraphs AO-AT, wherein the blended fuel is suitable for use as a winter diesel and/or an arctic diesel fuel.

AV. The blended fuel of any one of Paragraphs AO-AU, wherein the blended fuel is suitable for use as a jet fuel.

AW. A method for producing a blended fuel, the method comprising combining a composition of any one of Paragraphs A-O and a petroleum-based fuel and/or a synthetic fuel to produce the blended fuel.

AX. The method of Paragraph AW, wherein the blended fuel comprises about 1 wt % to about 80 wt % of the composition.

AY. The method of Paragraph AW, wherein the blended fuel comprises about 1 vol % to about 80 vol % of the composition.

AZ. The method of any one of Paragraphs AW-AY, wherein the petroleum-based fuel and/or synthetic fuel may each independently be a diesel fuel, a turbine fuel, an aviation fuel, or a combination of any two or more thereof.

BA. The method of any one of Paragraphs AW-AZ, wherein the blended fuel comprises a cloud point less than about −10° C.

BB. The method of any one of Paragraphs AW-BA, wherein the blended fuel comprises a freeze point less than about −40° C.

BC. The method of any one of Paragraphs AW-BB, wherein the blended fuel is a diesel fuel, an aviation fuel, or a combination thereof.

BD. The method of any one of Paragraphs AW-BC, wherein the blended fuel is suitable for use as a winter diesel and/or an arctic diesel fuel.

BE. The method of any one of Paragraphs AW-BD, wherein the blended fuel is suitable for use as a jet fuel.

Other embodiments are set forth in the following claims.

What is claimed is:

1. A method of producing a composition, the method comprising
contacting a feed stream comprising a biorenewable feedstock with a hydrotreatment catalyst in a fixed bed hydrotreatment reactor to produce a hydrotreated product; and
fractionating the hydrotreated product to produce the composition;
wherein
the biorenewable feedstock comprises at least one of palm kernel oil, coconut oil, babassu oil, microbial oil, or algal oil;
the hydrotreatment catalyst comprises a monometallic Mo catalyst;
the fixed bed hydrotreatment reactor
is at a temperature less than about 750° F.; and
is at a pressure from about 200 psig to about 4,000 psig; and
the composition comprises
at least 98 wt % $C_7$-$C_{12}$ n-paraffins, wherein at least 10 wt % of composition comprises n-decane, at least 20 wt % of the composition comprises n-dodecane, and at least 75 wt % of composition comprises even carbon number paraffins;
less than 0.1 wt % oxygenates; and
less than 0.1 wt % aromatics.

2. The method of claim 1, wherein the liquid hourly space velocity of the biorenewable feedstock through the fixed bed hydrotreatment reactor is from about 0.2 hr$^{-1}$ to about 10.0 hr$^{-1}$.

3. The method of claim 1, wherein the biorenewable feedstock further comprises animal fats, animal oils, plant fats, plant oils, vegetable fats, vegetable oils, or greases.

4. The method of claim 1, wherein the biorenewable feedstock further comprises one or more of animal fats, poultry oil, soybean oil, canola oil, carinata oil, rapeseed oils, palm oil, jatropha oil, castor oil, camelina oil, seaweed oil, halophile oils, rendered fats, restaurant greases, brown grease, yellow grease, waste industrial frying oils, fish oils, tall oil, and tall oil fatty acids.

5. The method of claim 1, wherein the biorenewable feedstock further comprises one or more of carinata oil, animal fats, restaurant greases, brown grease, yellow grease, and waste industrial frying oils.

6. The method of claim 1, wherein the feed stream further comprises a diluent and the volume ratio of diluent to biorenewable feedstock falls within the range from about 0.5:1 to about 20:1.

7. The method of claim 1, wherein the method comprises fractionating the hydrotreated product to produce the composition and one or more $C_{14}$-$C_{22}$ n-paraffin fractions comprising at least about 90 wt % $C_{14}$-$C_{22}$ n-paraffins.

8. The method of claim 7, wherein the one or more $C_{14}$-$C_{22}$ n-paraffin fractions comprises a fraction comprising at least about 90 wt % $C_{14}$-$C_{16}$ n-paraffins.

9. The method of claim 7, wherein the one or more $C_{14}$-$C_{22}$ n-paraffin fractions comprises a fraction comprising at least about 90 wt % $C_{14}$-$C_{18}$ n-paraffins.

10. The method of claim 7, wherein the one or more $C_{14}$-$C_{22}$ n-paraffin fractions comprises a fraction comprising at least about 90 wt % $C_{16}$-$C_{18}$ n-paraffins.

11. The method of claim 7, wherein the one or more $C_{14}$-$C_{22}$ n-paraffin fractions comprises a fraction comprising at least about 90 wt % $C_{18}$-$C_{20}$ n-paraffins.

12. The method of claim 7, wherein the one or more $C_{14}$-$C_{22}$ n-paraffin fractions comprises a fraction comprising at least about 90 wt % n-tetradecane.

13. The method of claim 7, wherein the one or more $C_{14}$-$C_{22}$ n-paraffin fractions comprises a fraction comprising at least about 90 wt % n-hexadecane.

14. The method of claim 7, wherein the one or more $C_{14}$-$C_{22}$ n-paraffin fractions comprises a fraction comprising at least about 90 wt % n-octadecane.

15. The method of claim 7, wherein the one or more $C_{14}$-$C_{22}$ n-paraffin fractions comprises a fraction comprising at least about 90 wt % n-icosane.

16. The method of claim 7, wherein the one or more $C_{14}$-$C_{22}$ n-paraffin fractions comprises a fraction comprising at least about 90 wt % n-docosane.

17. The method of claim 1, wherein the method comprises fractionating the hydrotreated product to produce the composition and two or more $C_{14}$-$C_{22}$ n-paraffin fractions, wherein each $C_{14}$-$C_{22}$ n-paraffin fraction independently comprises at least about 90 wt % $C_{14}$-$C_{22}$ n-paraffins.

18. The method of claim 17, wherein the two or more $C_{14}$-$C_{22}$ n-paraffin fractions comprise
a fraction comprising at least about 90 wt % n-tetradecane;
a fraction comprising at least about 90 wt % n-hexadecane; and
a fraction comprising at least about 90 wt % n-octadecane.

19. A method of producing a composition, the method comprising
contacting a feed stream comprising a biorenewable feedstock with a hydrotreatment catalyst in a fixed bed hydrotreatment reactor to produce a hydrotreated product; and
fractionating the hydrotreated product to produce the composition;
wherein
the biorenewable feedstock comprises at least one of palm kernel oil, coconut oil, babassu oil, microbial oil, or algal oil;
the fixed bed hydrotreatment reactor
is at a temperature less than about 750° F.; and
is at a pressure from about 200 psig to about 4,000 psig;
the composition comprises
at least 98 wt % $C_7$-$C_{12}$ n-paraffins, wherein at least 10 wt % of composition comprises n-decane, at least 20 wt % of the composition comprises n-dodecane, at least 75 wt % of composition comprises even carbon number paraffins, and a weight ratio of $C_{12}$ paraffins to $C_{11}$ paraffins from 3.0:1 to 1.2:1;
less than 0.1 wt % oxygenates; and
less than 0.1 wt % aromatics; and
the feed stream further comprises a diluent and a volume ratio of diluent to biorenwable feedstock falls within the range from about 0.5:1 to about 20:1.

20. The method of claim 19, wherein the liquid hourly space velocity of the biorenewable feedstock through the fixed bed hydrotreatment reactor is from about 0.2 hr$^{-1}$ to about 10.0 hr$^{-1}$.

21. The method of claim 19, wherein the biorenewable feedstock further comprises animal fats, animal oils, plant fats, plant oils, vegetable fats, vegetable oils, or greases.

22. The method of claim 19, wherein the biorenewable feedstock further comprises one or more of animal fats, poultry oil, soybean oil, canola oil, carinata oil, rapeseed oils, palm oil, jatropha oil, castor oil, camelina oil, seaweed oil, halophile oils, rendered fats, restaurant greases, brown grease, yellow grease, waste industrial frying oils, fish oils, tall oil, and tall oil fatty acids.

23. The method of claim 19, wherein the biorenewable feedstock further comprises one or more of carinata oil, animal fats, restaurant greases, brown grease, yellow grease, and waste industrial frying oils.

24. The method of claim 19, wherein the method comprises fractionating the hydrotreated product to produce the composition and one or more $C_{14}$-$C_{22}$ n-paraffin fractions comprising at least about 90 wt % $C_{14}$-$C_{22}$ n-paraffins.

25. The method of claim 24, wherein the one or more $C_{14}$-$C_{22}$ n-paraffin fractions comprises a fraction comprising at least about 90 wt % $C_{14}$-$C_{16}$ n-paraffins.

26. The method of claim 24, wherein the one or more $C_{14}$-$C_{22}$ n-paraffin fractions comprises a fraction comprising at least about 90 wt % $C_{14}$-$C_{18}$ n-paraffins.

27. The method of claim 24, wherein the one or more $C_{14}$-$C_{22}$ n-paraffin fractions comprises a fraction comprising at least about 90 wt % $C_{16}$-$C_{18}$ n-paraffins.

28. The method of claim 24, wherein the one or more $C_{14}$-$C_{22}$ n-paraffin fractions comprises a fraction comprising at least about 90 wt % $C_{18}$-$C_{20}$ n-paraffins.

29. The method of claim 24, wherein the one or more $C_{14}$-$C_{22}$ n-paraffin fractions comprises a fraction comprising at least about 90 wt % n-tetradecane.

30. The method of claim 24, wherein the one or more $C_{14}$-$C_{22}$ n-paraffin fractions comprises a fraction comprising at least about 90 wt % n-hexadecane.

31. The method of claim 24, wherein the one or more $C_{14}$-$C_{22}$ n-paraffin fractions comprises a fraction comprising at least about 90 wt % n-octadecane.

32. The method of claim 24, wherein the one or more $C_{14}$-$C_{22}$ n-paraffin fractions comprises a fraction comprising at least about 90 wt % n-icosane.

33. The method of claim 24, wherein the one or more $C_{14}$-$C_{22}$ n-paraffin fractions comprises a fraction comprising at least about 90 wt % n-docosane.

34. The method of claim 19, wherein the method comprises fractionating the hydrotreated product to produce the composition and two or more $C_{14}$-$C_{22}$ n-paraffin fractions, wherein each $C_{14}$-$C_{22}$ n-paraffin fraction independently comprises at least about 90 wt % $C_{14}$-$C_{22}$ n-paraffins.

35. The method of claim 34, wherein the two or more $C_{14}$-$C_{22}$ n-paraffin fractions comprise
- a fraction comprising at least about 90 wt % n-tetradecane;
- a fraction comprising at least about 90 wt % n-hexadecane; and
- a fraction comprising at least about 90 wt % n-octadecane.

* * * * *